(12) United States Patent
Atkinson

(10) Patent No.: US 8,869,253 B2
(45) Date of Patent: Oct. 21, 2014

(54) ELECTRONIC SYSTEM FOR SECURING ELECTRONIC SERVICES

(75) Inventor: Steven Paul Atkinson, Richmond (GB)

(73) Assignee: Monitise Group Limited, London (GB)

( * ) Notice: Subject to any disclaimer, the term of this patent is extended or adjusted under 35 U.S.C. 154(b) by 1532 days.

(21) Appl. No.: 12/224,820

(22) PCT Filed: Mar. 8, 2007

(86) PCT No.: PCT/GB2007/000805
§ 371 (c)(1),
(2), (4) Date: Aug. 12, 2010

(87) PCT Pub. No.: WO2007/102005
PCT Pub. Date: Sep. 13, 2007

(65) Prior Publication Data
US 2010/0299731 A1   Nov. 25, 2010

(30) Foreign Application Priority Data
Mar. 8, 2006 (EP) ..................... 06251242

(51) Int. Cl.
G06F 21/00 (2013.01)
G06F 21/42 (2013.01)
G06F 7/04 (2006.01)
H04L 29/06 (2006.01)

(52) U.S. Cl.
CPC .............. *H04L 63/068* (2013.01); *G06F 21/42* (2013.01); *H04L 63/0846* (2013.01); *H04L 2463/081* (2013.01)
USPC .............. 726/7; 726/6; 726/8; 726/9; 726/20; 713/183; 713/185

(58) Field of Classification Search
CPC . H04L 63/0853; H04L 9/32; H04L 2463/081; H04L 63/068; H04L 63/0846; G06F 21/42
See application file for complete search history.

(56) References Cited

U.S. PATENT DOCUMENTS

| | | | |
|---|---|---|---|
| 5,491,752 A * | 2/1996 | Kaufman et al. | 380/30 |
| 6,928,558 B1 * | 8/2005 | Allahwerdi et al. | 726/9 |
| 7,434,050 B2 * | 10/2008 | Jeffries et al. | 713/169 |
| 7,707,626 B2 * | 4/2010 | Albisu et al. | 726/8 |
| 2002/0178370 A1 * | 11/2002 | Gurevich et al. | 713/189 |
| 2003/0119493 A1 * | 6/2003 | Keller | 455/419 |
| 2004/0255119 A1 | 12/2004 | Ukeda et al. | |
| 2005/0154923 A1 * | 7/2005 | Lok et al. | 713/202 |
| 2006/0259601 A1 * | 11/2006 | Soelberg et al. | 709/223 |

(Continued)

OTHER PUBLICATIONS

M'Raihi, D., et al., "HOTP: An HMAC-based One Time Password Algorithm; Internet Draft: draft-mraihi-oath-hmac-otp-02.txt," IETF Standard-Working-Draft, Internet Engineering Task Force IETF CH No. 2 Oct. 2004 pp. 1-27.

(Continued)

*Primary Examiner* — Dede Zecher
*Assistant Examiner* — Trang Doan
(74) *Attorney, Agent, or Firm* — Blakely Sokoloff Taylor & Zafman

(57) ABSTRACT

A method of accessing an internet based service, involves using a cellular telephony device to obtain a token from the provider of the internet based service, and within the cellular telephony device, using the token to calculate a time-limited password. The time-limited password is used in combination with at least one further user identification parameter to obtain access to the internet based service.

23 Claims, 1 Drawing Sheet

(56) References Cited

U.S. PATENT DOCUMENTS

| | | | |
|---|---|---|---|
| 2006/0288405 A1* | 12/2006 | Albisu et al. ................... 726/8 |
| 2007/0016943 A1 | 1/2007 | M'Raihi et al. |
| 2007/0033649 A1* | 2/2007 | Henriksen .................. 726/20 |
| 2007/0050635 A1* | 3/2007 | Popp ............................ 713/185 |
| 2007/0101152 A1* | 5/2007 | Mercredi et al. ............ 713/185 |
| 2008/0176533 A1* | 7/2008 | Leleu ........................... 455/411 |

OTHER PUBLICATIONS

Haller, N., et al., "A One-Time Password System: rfc2289.txt," IETF Standard, Internet Engineering Task Force, IETF, CH, Feb. 1998, pp. 1-26.

Wapforum, "Provisioning Bootstrap, WAP-184-ProvBoot-20010314-a," OMA Standard, Mar. 14, 2001, pp. 1-24.

* cited by examiner

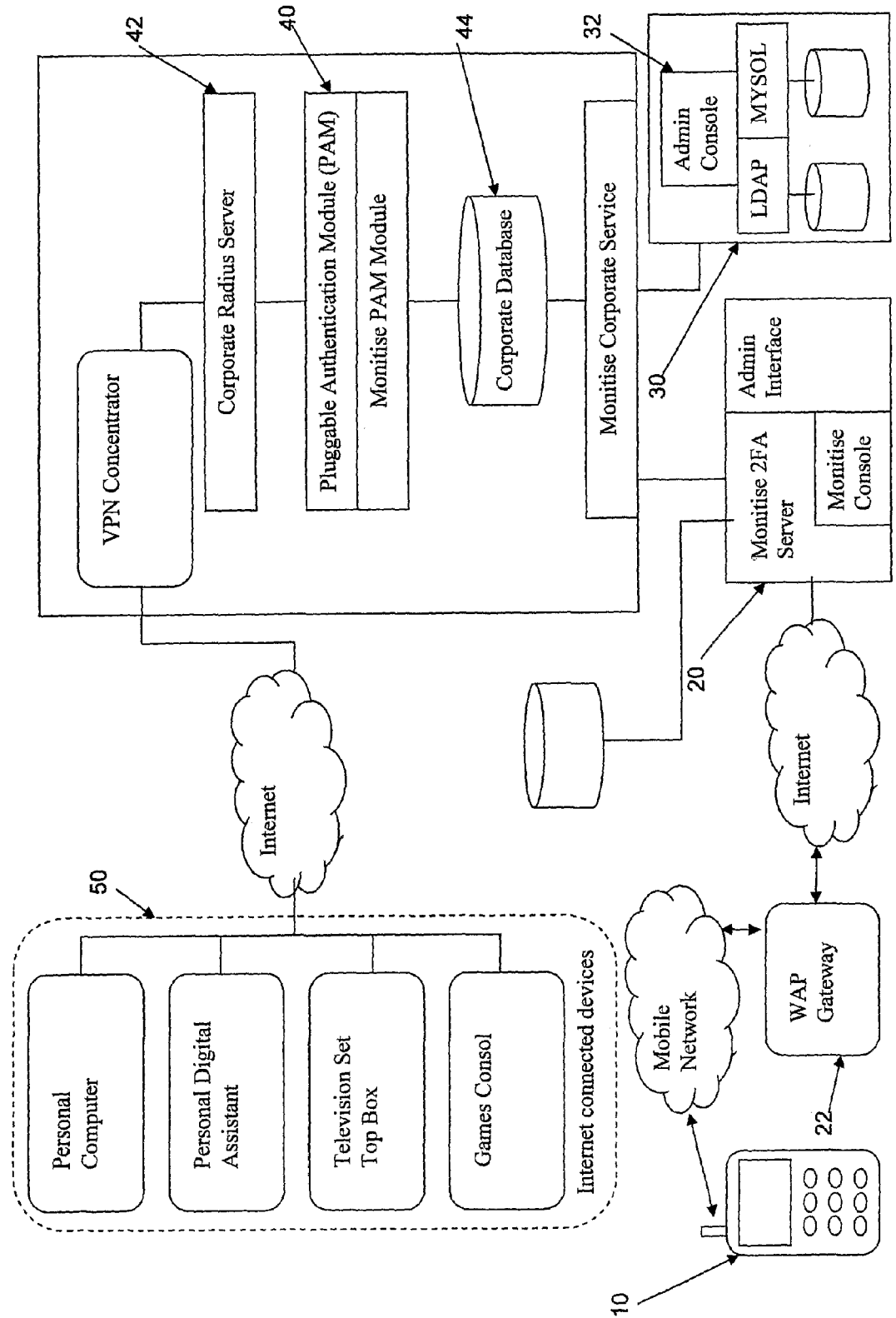

ELECTRONIC SYSTEM FOR SECURING ELECTRONIC SERVICES

This is a non-provisional application claiming the benefit of International application number PCT/GB2007/000805 filed Mar. 8, 2007.

FIELD OF INVENTION

This invention relates to the access control mechanisms for securing communication and service delivery carried out over consumer electronic communication channels. In particular this invention relates to the independent authentication and verification of a party or parties involved in business via electronic channels.

BACKGROUND TO THE INVENTION

In the modern world, more and more of us can, and do, access a wide and evolving range of services provided over electronic channels. We access these services via a relatively new range of devices from the mobile phone, through to the television and the personal computer. And this appears to have led to a common perception that the rate of change in our lives is increasing. A short time ago however, those forming the perception just mentioned, would surely have thought an impossible task the concept of an employee accessing an "in-office" experience from any location in the world with just a mobile phone and personal computer. It is commonplace now. This and other capabilities that have emerged have had, and are continuing to have, a dramatic effect on the way modern companies run and the way individuals live their lives.

Other previous periods of change created by the introduction of technology tell us though, that the ability to induce change is a critical aspect of successful and sustainable technology. This is especially so when looking at communication innovation. In fact, many commentators today reflect on the network effect potential when they analyse innovation. Or rather, they look more favourably on innovation that has the potential of introducing change, as a result of its introduction.

It is true that our lives are changing as a result of the introduction of technology, and this is especially so when considering communication technology. But a common problem exists; the problem of having access to a consistent and efficient system for automating the verification of identity. And with the inevitable improvements in access, price and capability of technology the problem will only get worse. Since with these improvements, the ability to sustain a globally connected world becomes a reality for the mass market.

Identity is critical element in the majority, if not all, communication we carry out across the available channels today and tomorrow. And without the problem of identity solved, the transfer of more and more business to electronic channels to achieve the efficiency gains that the new channels provide will continue to be severely hampered.

It is now commonplace, if not a business critical function, for modern companies and organisations to restrict access to both physical and electronic premises. In respect to physical premises access is usually controlled through the issuance of an identification card to all relevant employees or temporary employees. The employee identification card gives a company a simple and easy to use regime to control access to physical premises to a set of known people. The identification card is simply checked (often having a photograph of the employee to improve security) either manually or automatically as an employee enters and leaves.

There have been many schemes and technology solutions on offer to companies and organisation in order for them to protect their electronic premises, whether that be a private corporate network or increasingly Internet resources. The majority of solutions in place today use the same concept as an identification card where an employee is given identification information that is unique to them. In the same way that the employee is expected to show and have authenticated a identification card, an employee would be expected to enter their unique identification credentials in order for them to gain access to an electronic resource. However, these present schemes have major disadvantages including the overall security of access control systems based on this method.

The problem to which this invention is directed, relates to the current methods for identification and subsequent authorisation of an employee or customer to legitimately gain access to an electronic resource such as a corporate network or Internet service. In this case, access could be initiated by an employee or customer from devices such as, but not limited to, a personal computer, personal digital assistant, television or games console connected to the Internet. The Internet connection in this case could be over a fixed line, Wi-Fi or cellular data connection (for example GPRS or 3G network connection). Furthermore, the problem to which this invention is directed, relates to the current methods of identification and authorisation of an employee or customer to access a voice service such as a bank call centre or customer care call centre. In this case, a customer or employee from a mobile phone initiates access to a call centre, for example to discuss a banking service, and the invention provides a solution to the problem of pre-authentication into an automated call centre operation.

The current mechanisms for authentication of an individual include the issue and use by the individual of a username and password or the issue and use by the individual of a username, PIN and automatically generated numeric code from a token card. These mechanisms for authentication and verification have a number of serious disadvantages including (1) management of the user credentials by the corporate or merchant; (2) the associated cost with registration, issuing and ongoing maintenance of the credentials; and (3) the ability to maliciously gain access to a consumer or user's online credentials.

In the case of simple username and password authentication credentials, an individual is required to enter these when requested to identify him or herself. These credentials are usually electronically transmitted over a secure link to be verified and once verified the individual is granted access to the resource; for example this can be but not limited to access to a secure network or secure portion of an Internet application. In order for this authentication system to operate effectively, the corporate or merchant is required to operate the registration, verification and management operational procedures. Hence an employee or customer is required to register and either self choose or be issued with a unique username and password. These credentials have to be stored securely and when required, be compared with credentials entered by an individual to authenticate himself or herself for access to a resource.

In the case of username, PIN and token card credentials, an individual enters their username, PIN and current numeric value from the token card when requested. These credentials are usually transmitted over a secure link and verified by systems employed by the employer or merchant. In this case, verification includes algorithm-based verification to ensure that the username, PIN and generated numeric token are valid. If these credentials are proved correct then the employee or customer is allowed access to the Internet application or corporate network. It can be seen that the use of a token card significantly improves the strength of the authentication credentials since the token card mathematically generates a series of one-time, time-limited codes and as such the employee or customer is required to have the token card in their possession when authenticating themselves. Of course, this does require the issuance of token cards, with consequent costs, and also inconvenience for the user.

The management and control of authentication credentials require corporations and merchants to employ a wide range of services. These services include registration, secure delivery, verification and control processes in the case of users loosing or forgetting their personal credentials. As the number of internet-connected homes increases and the number of Internet services increases it follows that the associated operating costs to corporations and merchants will also increase.

Together with the operating costs associated with managing and controlling user credentials a severe problem exists with the inherent security of Internet connected devices. It is well understood by the information technology industry that the personal computer environment is prone to malicious attacks and this problem is increasing as the number of Internet connected homes increases. The Association of Payment and Clearing Services (APACS) have identified a number of methods used by fraudsters that severely affect the security of online resources that use a simple username and password. These methods include Phising attacks and Trojan horse attacks. The purpose of both of these attack types is to gain access to a customer or users Internet credentials enabling, therefore, the ability for a fraudster to assume the identity of the customer or user.

A phising attack usually takes the form of an electronic communication mechanism such as email that requests the customer or user to supply their Internet credentials via an email that purports to be from the corporate or merchant.

A Trojan horse attack is designed to collect keystroke information as the customer or user enters their credentials and automatically transfers these to the fraudster. Once the username and password has been gained it simply enables a third party to assume the identity of the customer or user to gain access to the specific Internet or corporate resource.

The invention aims to provide an alternative service access mechanism which reduces some of these problems.

SUMMARY OF THE INVENTION

According to a first aspect of the invention, there is provided a method of accessing an electronic service, the method comprising:
  using a cellular telephony device to obtain from time to time a token from the provider of the internet based service;
  within the cellular telephony device, using the token to calculate a time-limited password, wherein the time-limitation of the password is dependent on the token; and
  using the time-limited password to obtain access to the electronic service, which comprises an internet based service or a voice based system.

Examples of the invention provide a multi-factor authentication mechanism that includes registration processes, provisioning processes and applications and services to generate one-time, time-limited access credentials. This achieves independent authentication and verification. The access credentials are generated as a result of user intervention and can preferably be generated both on and offline. Because, by its very nature, the problem is an ecosystem problem, the system of the invention has been designed to take a stakeholder approach in which all affected parties are expected to contribute to the service and in which, uniquely, all parties benefit for their contribution.

Preferably, obtaining access to the service further comprises using at least one further user identification parameter.

According to a second aspect of the invention, there is provided a method of providing access to a electronic service comprising an internet based service or a voice based system, the method comprising:
  generating a token in network and out of network coverage and providing the token to a cellular telephony device of a user seeking access to the service;
  using the token to calculate a time-limited password for the specific user;
  receiving a time-limited password from the user calculated using the token; and
  verifying the time-limited password to grant access to the electronic service.

Preferably at least one further user identification parameter is received with the time-limited password, and wherein verifying the time-limited password and the at least one further user identification parameter is verified with the time-limited password to grant access to the Internet based service or voice channel service.

This invention provides corporations and merchants a significantly more secure and more commercially efficient mechanism than existing solutions. The invention uses a subset of the facilities of a cellular phone to provide additional security. In particular, the invention provides a cellular phone based two factor authentication system.

The invention provides a pragmatic, secure and cost effective mechanism for corporations and merchants of all sizes. By utilising existing services and devices that customers and employees have in their possession (cellular telephones or similar cellular connectivity devices), the invention provides a significant advantage to address both the associated operating costs and inherent security issues of the common existing authentication methods.

Furthermore, the invention provides mechanisms to enable pragmatic identity management suitable for the increasing the number and sophistication of Internet services and provides a holistic service for authentication and identity management suitable for the wide range of services that are in existence today, as well as a foundation for services as the communication and technology industry rapidly adapt especially as the services provided by communication companies aggregate. These services may include a wide range of services from voice through to data services and entertainment services which are being provided by communication companies.

The invention can be implemented as a standalone application, a plug-in to another mobile application or as a standalone personal computer application. In this way the invention can be implemented on a wide variety of devices and applications.

One of the main purposes of the invention is the creation of a time-limited password. The time-limited password is used in conjunction with other personal information in order for secure authentication of a user. Uniquely the time-limited password can be created without the necessity to utilise the network from the mobile phone—enabling the service to be used in and outside network coverage. The calculation of the time-limited password can take into account the current time as well as an identity parameter of the cellular telephony device. For example, the calculation may use the function:

Password=f(IP XOR NT XOR t), where t is a measurement of the current time, IP is an identity parameter of the cellular telephony device and NT is the numeric token. The function f can then comprise:

f(x)=RightTrunc(Decimal(SHA(x))), wherein RightTrunc is a function to extract a lowest number of bits, Decimal is a function to convert a byte array to an integer value, and SHA is a secure hash algorithm.

The at least one further user identification parameter may comprises a username and optionally a user password or personal identification number. Thus, the conventional username and PIN numbers are supplemented by a time-limited password, and one which is generated locally in response to a token (e.g. in the form of a salt value).

The token may also have time-limited validity, for example between 1 hour and 1 week. The time-limited validity can be configured through the administration console of the service.

During the validity of the token, access to the internet based service can be enabled without requiring communication with the server used to generate the token. This addresses the possible network coverage problems, and thus provides both an on-network and off-network authentication service, to enable access to the service. This further enhances the flexibility of the invention in enabling authentication of an employee or customer for accessing a secure web resource or company network whether in or out of cellular telephone network coverage.

The validity of the token can be defined as a time window, with time windows for sequential tokens overlapping. This addressing timing issues.

The provision of the token to the cellular telephony device is preferably dependent on authentication of the cellular telephony device, so that authentication can be denied as soon as a mobile telephony device is reported stolen or missing. For example, the authentication can comprise verifying the at least one further user identification parameter as being associated with the specific cellular telephony device using a registered user database. The specific cellular telephony device can be identified using the MSISDN.

When providing the token, clock synchronisation between the cellular telephony device and the provider of the Internet based service is also implemented, and this provides the correct timing for the time-limited password.

The invention also provides a computer program comprising code for implementing the methods of the invention when run on a computer.

The invention also provides a system for providing access to an electronic service, comprising an internet based service or a voice based system, from a cellular telephony device, the system comprising: a server of a provider of the service, and comprising means for generating a token; and a software application for installation on a cellular telephony device, the software application enabling calculation of a time-limited password from the token, wherein the time-limitation of the password is dependent on the token, wherein the server further comprises means for verifying the time-limited password to enable or prohibit access to the service.

BRIEF DESCRIPTION OF THE DRAWINGS

An example of the invention will now be described with reference to the accompanying FIGURE that shows the system of the invention.

DETAILED DESCRIPTION

The invention will be described with respect to using cellular mobile phones as a token in a multiple token access control mechanism but it is not intended that the invention in its broadest sense is restricted to such devices.

The invention is comprised of a number of components that together deliver a secure two-factor authentication mechanism for corporations and merchants. The service provides both an off-network and on-network mechanism for generating a one-time, time-limited password that is used in conjunction with other authentication components by an employee or customer to legitimately access a corporate network or secures Internet application or service from an Internet connected device.

Instead of requiring a simple username and password or username PIN and token to gain secure access the user has a cellular phone based application that is used to generate a one-time password. The one time password is configurable but can for example consist of a six digit numeric code. The user enters their nominated username, passcode (if required) and the generated one-time password. These credentials are securely transmitted and authenticated within the corporate or merchants authentication servers (such as RADIUS servers) and if authentication is successful access is granted to the user.

The system of the invention can be used to secure the voice channel using a similar mechanism. In this case the employee or consumer would request to be connected to a call centre within the application or host application. The system of the invention generates a one-time, time-limited password that is presented to the call centre as DTMF tones. In this case similar authentication mechanisms would be utilised to verify the time-limited password before access is granted to the consumer.

As shown in the FIGURE, the system of the invention is comprised of a number of components including:

Cellular phone based application (on cellular phone 10)

Two factor authentication server (for the authentication process) 20

Administration server (for providing the service to the user) 30

Pluggable authentication module 40

These components are described in further detail in the following sections.

Cellular Phone Based Application

The cellular phone based application is developed using the appropriate programming language to suit the country of deployment. This includes, but not limited to Java, BREW and Symbian. The cellular phone based application has also been designed to execute as a plug-in or extension to an existing cellular phone application such as a mobile banking application. In this case the application would execute as an extension to a current application.

The purpose of the cellular phone application is to securely generate a one-time password to be used as part of the authentication credentials. The one-time password is generated as a result of the user requesting a one-time password from the cellular application or plugin.

To offer the maximum level of security and flexibility the cellular phone application has two modes of operation (1) on-network operation; and (2) off-network operation.

The on-network operation provides the functionality to:

Open a secure connection to the two factor authentication server.

Transmit the unique client identifier, current time (based on the cellular phone internal clock) and the version of the cellular application.

Receive from the two-factor authentication server a new salt value and salt expiration time Store the salt value and salt expiration date securely in the internal data storage area of the cellular phone.

Calculate a new one-time password using the one-time password algorithm described below.

Display the one-time password on the cellular phone screen for the user to enter into the authentication input screen of the internet terminal they are using.

The off-network operation provides the functionality to:

Attempt to open a secure connection to the two factor authentication server.

If the attempt fails the cellular application examines the internal data storage to extract the salt value and salt expiration date If the salt value exists and the salt expiration date has not expired the application calculates the one-time password using the algorithm described below.

Display the one-time password on the cellular display screen for the user to enter into the authentication input screen of the internet terminal they are using.

If the salt expiration date has expired display an error message indicating that the user has to move into network coverage to re-synchronise the salt value and the salt expiration date.

In order to reduce the risk of an eavesdropping attack, the one time password is not transmitted to the cellular phone application but generated within the cellular phone application as a result of being requested by the user.

The generation is based upon a random salt value that is transmitted to the cellular phone application to be used in the following algorithm. In calculating the one-time password, the cellular phone application uses the following algorithm:

$$\text{One-time password}=\text{RIGHTTRUNC}(\text{DECIMAL}(\text{SHA1}(\text{seed XOR salt XOR time})))$$

Where:
Time=number of minutes since 1 Jan. 1970 to nearest minute (16 bytes)
Seed=random value provisioned in cellular phone application environment (16 bytes)
Salt=random value sent to client during re-synchronisation (16 bytes)
XOR=boolean XOR operation
SHA1=secure hash algorithm version 1.0 digester
DECIMAL=function to convert 16 byte array to an integer value
RICHTTRUNC=function to extract 6 rightmost (lowest) digits of value Two Factor Authentication Server The two-factor authentication server 20 can be hosted as a managed service for customers of the two-factor authentication service or as a installed service within their environment.

The two-factor authentication server completes a number functions required for the effective running of the service including:

Provides secure access to the two factor authentication server
Cellular phone application management and distribution
Customer management and customer configuration options
Report generation for individual customers of the service
Testing functionality for pre-service live functions.

During the resynchronisation of the cellular phone application, the application connects securely to the two-factor authentication server 20. The authentication of the cellular phone is based upon a number of factors including serial number of the cellular phone application and MSIDN of the cellular phone connecting and the time from the cellular phone internal clock. The cellular phone application is verified against the registered users database using the MSISDN and client application serial number. Once verified the salt value and the salt expiration date is calculated and securely transmitted back to the cellular phone application to generate the one-time password. The corporate service hosted in the customers location is also updated with the relevant information for subsequent authentication, this includes the cellular phone serial number, salt value and system time received from the cellular phone application.

The two factor authentication server 20 also manages the provisioning of a new end user of the service. Once instructed by the administration service the two factor authentication server will transmit a WAP Push message (using WAP gateway 22) to the relevant user and subsequently manage the downloading and installation of the cellular phone application.

The two-factor authentication server also has intelligence built in to automatically handle the wide variety of cellular phones and differing connection specifications. During the provisioning process for an end user the most appropriate cellular phone application is chosen based upon the connection details received as the cellular phone requests the application. During subsequent connections the two factor authentication server will also update the cellular phone application as necessary, for example if a new application has been developed.

The two factor authentication server enables a number of options to be configured for customers of the service. The configuration options currently include the ability to specify the authentication tokens required this being either username and one-time password or username, PIN and one time password. In the case of requiring a PIN the two factor authentication server 20 manages the distribution of the PIN via SMS to the end user.

A range of reports are available from the two factor authentication server. These include usage reports across companies using the service and reports for usage of individual companies using the service. The reports are generated either on an adhoc basis or generated at specific time intervals.

A range of test tools are available from the two factor authentication server 20 including URL testing, SMS testing and individual one-time password generation tests. The test services are designed to test individual company services as part of the commissioning process for the service.

Administration Server

The administration server 30 and console 32 are designed to provide all the necessary tasks for administrating the service for a customer. The administration tasks available include user management, the triggering of provisioning processes for end users and the issue or re-issue of passcodes to be used as part of the authentication credentials.

Since the service is managed as a hosted service the service supports multiple organisations. The Administration console enables specified administrators to create new corporate accounts. Within these corporate accounts the Administration console enables end-users to be added. The information entered includes end-user MSISDN, end user description and end-user email contact details. As part of the creation of new end-users the Administration server allocates a cellular phone application linking the MSISDN with the serial number of the application and messages the two factor authentication server to deliver the application to the end user.

Pluggable Authentication Module

Through a custom PAM (Pluggable Authentication Module) 40, the cellular phone based two-factor authentication system is designed to integrate with any standards based authentication server such as a RADIUS authentication server 42. This modules role is to validate user credentials entered at logon and presented to the RADIUS server for authentication by checking tables in a corporate database 44 for the end users seed, salt and client time difference an calculating the appropriate one-time password (OTP).

The OTP is only calculated at the point of authentication, and it follows that since the OTP is based on the current time that old OTP values are automatically expired. For the best customer experience, the Pluggable Authentication Module 40 is able to check not only against the current one-time password but also for the last one-time password generated based on a 'sliding time' window rule. This enables the system to manage the inevitable differing speeds and synchronisation mechanisms used within individual cellular phones. The sliding window rule is configurable through the administration server to suit the local market conditions.

The rule states that if after time correction (to bring the server time in line with the cellular phone system clock), the time is within the first 30 seconds of a particular minute then both the current one-time password and the previous one-time password is checked for authentication. This will enable the user between 30 and 90 seconds to transfer the one-time password from the cellular device to their logon entry box and submit it to the authentication server such as a RADIUS server.

While in offline mode it is possible for the cellular phone application to loose synchronisation with the server, the 60-90 second window is designed to allow a large margin for error before the customer experiences any difficulty.

As shown in the FIGURE, once the correct one-time password is obtained, this enables access to the service provided over a variety of internet enabled devices 50, including personal computers, PDAs, TV set top boxes and games consoles. This access is granted based on the OTP and at least one further identification of the user, but more typically a password and PIN in addition to the OTP.

Of course, the OTP generated by the system and method of the invention can be used to increase security by supplementing a wide variety of existing known security measures.

In the examples above, the OTP is used in combination with other parameters to enable access to services. However, in some situations the OTP alone may be used, for example to provide access to different areas within a site. For example once general access to a site has been granted, an OTP may be required for access to specific parts with different security levels or age restrictions.

The description above describes in detail a system for generating time limited passwords for use in accessing internet based services. As will be clear from the description above, the same password generation mechanism can be used to generate passwords for use in other applications, such as voice based systems, or other applications.

The system of the invention uses a token received from the service provider to generate a time-limited password, so that the password generation is based on a two-way communication. The token contributes to the time limitation of the password so that two-way communication is required. However, the password generation can also be performed offline, as the token has a period of validity. Thus, periodic token generation is combined with password generation using the current time to provide the time limitation function to the password.

Various modifications will be apparent to those skilled in the art.

The invention claimed is:

1. A method of providing access to an internet based service, the method comprising:

generating a token in a server of a provider of the service and providing the token to a cellular telephony device of a user seeking access to the service;

calculating within the cellular telephony device a time-limited password for the specific user using the token;

receiving a time-limited password from the user calculated using the token; and verifying the time-limited password to grant access to the internet based service, wherein the token has time limited validity, and wherein during the validity of the token, access to the internet based service is enabled without requiring communication with the server used to generate the token.

2. A method as claimed in claim 1, wherein at least one further user identification parameter is received with the time-limited password, and wherein verifying the time-limited password and the at least one further user identification parameter is verified with the time-limited password to grant access to the internet based service.

3. A method as claimed in claim 1, wherein the calculation of the time-limited password takes into account the current time.

4. A method as claimed in claim 1, wherein the calculation of the time-limited password takes into account an identity parameter of the cellular telephony device.

5. A method as claimed in claim 1, wherein the calculation of the time-limited password uses the function:

Password=$f(IP \text{ XOR } NT \text{ XOR } t)$, where t is a measurement of the current time, IP is an identity parameter of the cellular telephony device and NT is the numeric token.

6. A method as claimed in claim 5, wherein the function f comprises:

$f(x)$=RightTrunc(Decimal(SHA(x))), wherein RightTrunc is a function to extract a lowest number of bits, Decimal is a function to convert a byte array to an integer value, and SHA is a secure hash algorithm.

7. A method as claimed in claim 1, wherein the at least one further user identification parameter comprises a username.

8. A method as claimed in claim 7, wherein the at least one further user identification parameter comprises a user password or personal identification number.

9. A method as claimed in claim 1, wherein the token comprises a numeric token in the form of a salt value.

10. A method as claimed in claim 1, wherein the validity is limited to a value between 1 hour and 1 week.

11. A method as claimed in claim 1, wherein the validity of the token is defined as a time window, with time windows for sequential tokens overlapping.

12. A method as claimed in claim 1, wherein the provision of the token to the cellular telephony device is dependent on authentication of the cellular telephony device.

13. A method as claimed in claim 12, wherein the authentication comprises verifying the at least one further user identification parameter as being associated with the specific cellular telephony device using a registered user database.

14. A method as claimed in claim 13, wherein the specific cellular telephony device is identified using the MSISDN.

15. A method as claimed in claim 1, wherein when providing the token, clock synchronisation between the cellular telephone device and the provider of the internet based service is also implemented.

16. A method as claimed in claim 1, wherein access to the internet based service is implemented over an internet connected device.

17. A method as claimed in claim 16, wherein the internet connected device comprises one of a personal computer, a PDA, a TV set top box and a games console.

18. A computer program comprising code for implementing the method of claim 1 when run on a computer.

19. A computer program product comprising a computer program as claimed in claim 18 embodied on a non-transitory computer readable medium.

20. A system for providing access to an internet based service from a cellular telephony device, the system comprising:
- a computer server of a provider of the internet based service, and comprising a computer processor configured to generate a token;
- a communication network adapted to provide the token to a cellular telephony device of a user seeking access to the service; and
- a software application for installation on the cellular telephony device, the software application enabling calculation, within the cellular telephony device, of a time-limited password from the token,
- wherein the computer server further comprises a computer processor configured to receive the time-limited password from the user and verify the time-limited password to enable or prohibit access to the internet based service,
- wherein the token has time limited validity, and
- wherein during the validity of the token, access to the internet based service is enabled without requiring communication with the computer server used to generate the token.

21. A system as claimed in claim 20, wherein the computer server further comprises means for verifying at least one further user identification parameter.

22. A system as claimed in claim 20, wherein the calculation of the time-limited limited password uses the function:
Password=f(IP XOR NT XOR t), where t is a measurement of the current time, IP is an identity parameter of the cellular telephony device and NT is the numeric token.

23. A system as claimed in claim 22, wherein the function f comprises:
f(x)=RightTrunc(Decimal(SHA(x))), wherein RightTrunc is a function to extract a lowest number of bits, Decimal is a function to convert a byte array to an integer value, and SHA is a secure hash algorithm.

* * * * *